United States Patent [19]

Brühmann

[11] Patent Number: 4,497,295
[45] Date of Patent: Feb. 5, 1985

[54] MINIMUM-MAXIMUM SPEED GOVERNOR FOR FUEL-INJECTED ENGINES

[75] Inventor: Werner Brühmann, Stuttgart, Fed. Rep. of Germany

[73] Assignee: Robert Bosch GmbH, Stuttgart, Fed. Rep. of Germany

[21] Appl. No.: 552,199

[22] Filed: Nov. 15, 1983

[30] Foreign Application Priority Data

Dec. 18, 1982 [DE] Fed. Rep. of Germany ....... 3246992

[51] Int. Cl.$^3$ ............................................. F02D 31/00
[52] U.S. Cl. .................................... 123/374; 123/372; 123/368
[58] Field of Search ............... 123/374, 373, 372, 364, 123/365, 366, 367, 368

[56] References Cited

U.S. PATENT DOCUMENTS

| 3,577,968 | 5/1971 | Staudt et al. | 123/373 |
| 3,946,715 | 3/1976 | Staudt | 123/374 |
| 4,286,558 | 9/1981 | Djordjevic et al. | 123/368 |

FOREIGN PATENT DOCUMENTS

| 2900198 | 7/1980 | Fed. Rep. of Germany. |
| 3018720 | 11/1981 | Fed. Rep. of Germany. |
| 2042072 | 9/1980 | United Kingdom | 123/374 |

Primary Examiner—Magdalen Y. C. Moy
Attorney, Agent, or Firm—Edwin E. Greigg

[57] ABSTRACT

The governor includes a force transmission lever subject to the prestressing force of a main governor spring, which lever the governor sleeve comes into operative contact after traversing an idling sleeve path a, and a leaf spring acting as the idling spring. The leaf spring is supported between its two ends on a curved rolloff path, determining its effective spring length, of a support bearing, the operative position of which is adjustable toward the leaf spring in accordance with the pivot angle ($\beta$) of an adjusting member by means of an adjusting cam actuable by the adjusting member such as to increase the prestressing force of the leaf spring. The adjusting cam is supported on the force transmission lever in order to prevent influencing the maximum engine speed. With the adjusting member shifted from the idling position toward the full-load position, the corresponding governor characteristic curve is shifted, simultaneously with an increased supply quantity controlled by the governor, toward a higher partial-load engine speed, and by means of the spring rate of the leaf spring which changes as the engine runs up to maximum speed, governor characteristic curves are produced which continuously drop exponentially.

10 Claims, 3 Drawing Figures

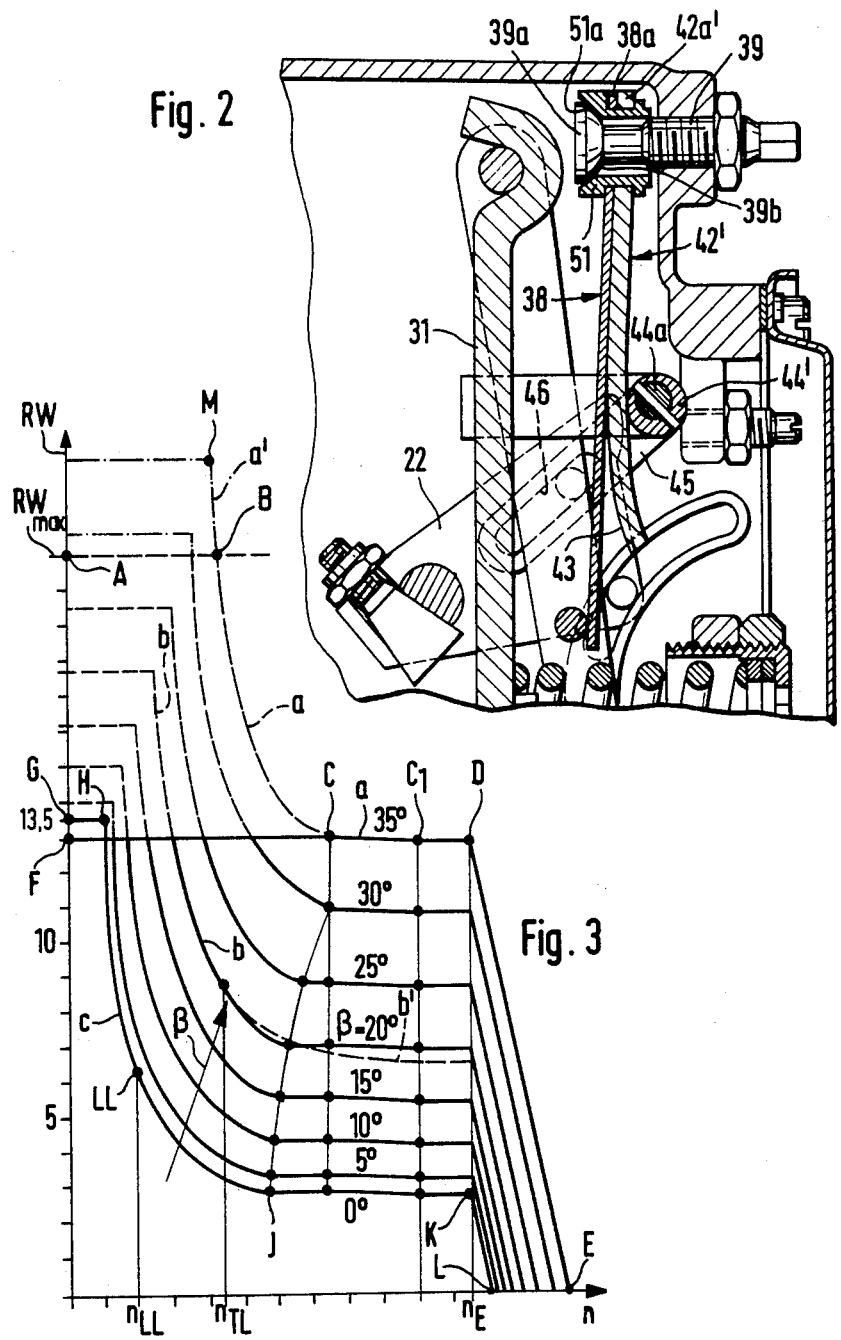

MINIMUM-MAXIMUM SPEED GOVERNOR FOR FUEL-INJECTED ENGINES

BACKGROUND OF THE INVENTION

The invention is based on a minimum-maximum speed governor for fuel-injected internal combustion engines. A speed governor of this kind is already known (German Offenlegungsschrift No. 30 18 720), in which a leaf spring acting as the idling spring rolls off in accordance with rpm on a two-part support bearing provided with a contoured rolloff path; the form selected for the contoured rolloff path produces a spring characteristic such that the idling regulation is stabilized. By means of an adjusting cam actuatable by the adjusting member, the second part of the support bearing, which is supported on the governor housing, can be forced away from the leaf spring when the adjusting member is pivoted into the full-load position, the intended result being to reduce as much as possible the influence of the leaf spring during full-load speed regulation. In this type of minimum-maximum speed governor, it is unnecessary to use an additional idling spring such as is used for instance in a minimum-maximum speed governor of similar design known from German Offenlegungsschrift No. 29 00 198.

With both the known governors, a sufficiently large load increase is possible while the engine speed is dropping, and because of the idling spring as it rolls or by means of the additional idling spring, the P-degree or speed drop is increased in the direction of a higher rpm, so that the engine is "intercepted" when the load is rapidly decreasing and will not stall. In both speed governors, the exertion of force by the idling springs is at least predominantly precluded after the idling sleeve travel distance has been covered, as a result of which, advantageously, these springs either do not influence the speed regulation characteristic curve or else do so only to an insignificant extent. However, despite the improved idling speed regulation attained with them, both known speed governors operating as minimum-maximum speed governors of an injection pump for Diesel vehicle engines have a so-called "start-up weakness", the source of which is the relatively small increase in fuel quantity when the adjusting member has been pivoted out of the idling position. Furthermore, in the known minimum-maximum speed governors no speed regulation takes place between the idling range and the maximum engine speed, except for a torque control which may be provided in some cases. Because of the lack of a regulating function above the idling range until the breakaway point where speed regulation is effected, not only is there reduced engine smoothness, but starting up is more difficult when there is high driving resistance, for instance when engaging the engine while driving uphill; as a result, if the position of the adjusting member (the driving pedal position) is unchanged, the engine can either race up to the maximum full-load speed or "killed", depending on the torque difference. Engine racing causes increased clutch wear, among other effects.

OBJECT AND SUMMARY OF THE INVENTION

The speed governor according to the invention has the advantage over the prior art that by means of the adjusting cam actuatable by the adjusting member, and with the adjusting member pivoted out of the idling position into a partial-load position, the smoothness of engine operation is substantially improved. If the adjusting member is displaced from the idling position in the direction of full load, then the increase in prestressing force of the leaf spring together with the increase in the supplied fuel quantity controlled by the governor lever results in the attainment of a higher partial-load rpm, dependent on the load. By means of the governor sleeve which is displaced as the engine accelerates, the spring rate of the leaf spring is continuously increased, producing characteristic governing curves which continuously drop exponentially, and thereby substantially improving the ride. The resultant shape of the performance graph—with the pivoting of the adjusting member at relatively low engine speed, the fuel quantity increases sharply; the characteristic curves in the medium speed range are dropping; and there is a slight increase in fuel quantity in the lower load range at a relatively high engine speed—combines the advantages of a minimum-maximum speed governor with those of an all-speed governor while avoiding their specific disadvantages. In addition to the effects on starting behavior already mentioned, the tendency to "bucking" is also reduced sharply. By means of the adjusting cam supported on the force transmission lever, the influence of the lead spring is precluded at the point of full-load speed regulation, without requiring additional adjusting devices to that end.

As a result of the characteristic disclosed, advantageous improvements to and further developments of the minimum-maximum speed governor disclosed are attainable. By means of the connecting link guide on the adjusting lever of the adjusting cam, the governor performance graph is adaptable within wide limits to required operating conditions, while the characteristic of the adjusting cam rotatable in accordance with the pivot angle of the adjusting member, is known per se from the prior art already mentioned, that is, German Offenlegungsschrift No. 30 18 720.

If the speed governor according to the invention is provided with the characteristics known from the prior publications mentioned above, then it is possible to set the increase in the controlled fuel supply quantity taking place per angular degree of the pivot angle through which the adjusting member travels, and simultaneously also to set the course of the partial-load engine speeds established in accordance with the load, in such a manner as to effect, for instance, a supply quantity which increases progressively over the pivot angle of the adjusting member, at least at relatively low engine speeds.

The invention will be better understood and further objects and advantages thereof will become more apparent from the ensuing detailed description of two preferred embodiments taken in conjunction with the drawings.

BRIEF DESCRIPTION OF THE DRAWINGS

FIG. 2 is a detail of the second exemplary embodiment, showing only those characteristics essential to the invention; and FIG. 3 is a diagram showing curves of the regulation performed by the governor according to the invention.

DESCRIPTION OF THE PREFERRED EMBODIMENTS

Figure 1:
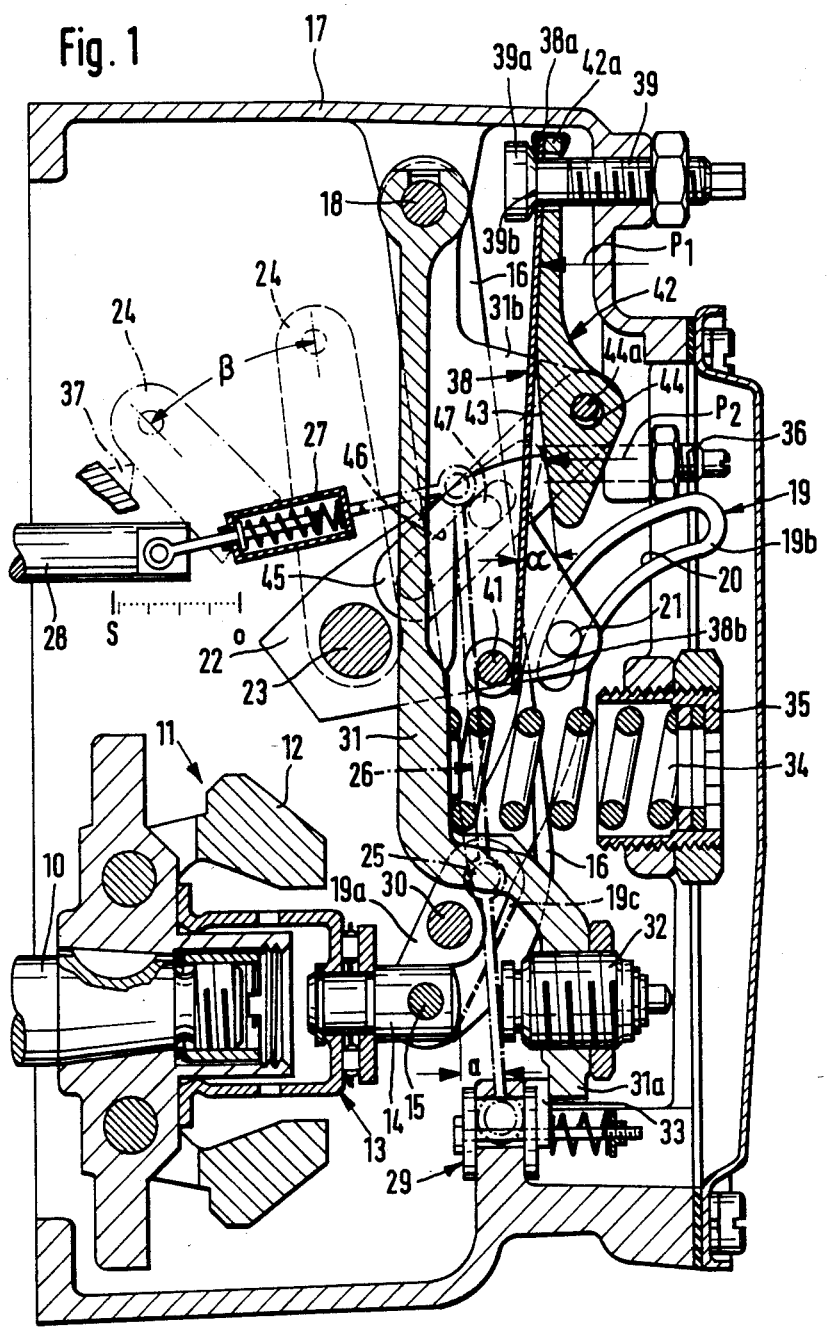
FIG. 1 is a sectional view taken through the first exemplary embodiment of the invention.

In the first exemplary embodiment of a minimum-maximum speed governor according to the invention, shown in longitudinal section in FIG. 1 and embodied as a centrifugal governor, a centrifugal governor 11 is secured on a camshaft 10 of an injection pump for internal combustion engines; the pump is known and therefore not shown further. The pivotably supported flyweights 12 of the governor 11 transmit their pivoting movement, effected by rpm-dependent centrifugal force, in the form of a sleeve stroke onto a governor sleeve 13 and its sleeve bolt 14. The sleeve bolt 14 is articulated by means of a bearing tang 15 on a guide lever 16, which is pivotable on a pivot shaft 18 secured in a governor housing 17 and thus guides the governor sleeve 13 in its reciprocating movements. By means of the bearing tang 15, one end 19a of a deflecting lever 19 is also articulatedly connected with the sleeve bolt 14 of the governor sleeve 13, and another end 19b of this deflecting lever 19 is articulatedly coupled with a lever-like adjusting member 22 via a pin 21 engaging a connecting link guide 20 of the deflecting lever 19. The adjusting lever 22 is secured on a lever shaft 23 supported in the governor housing 17 and acting as a pivot shaft. The lever shaft 23 furthermore carries an operating lever 24 located outside the governor housing and shown in dotted lines. The deflecting lever is coupled via a bearing point 25 disposed between its two ends 19a and 19b with a governor lever 26, which is embodied as a two-armed lever; at one end, the governor lever 26 is articulated via a resiliently yielding tongue 27 onto a governor rod 28, which serves as the supply quantity adjusting member of the injection pump, while on the other end it is supported on an adjustable and resiliently yielding pivot bearing 29. The governor lever 26 is shown as being located in front of the sectional plane of the drawing, and in such a case the bearing location 25 is secured on a second lever part 19c of the deflecting lever 19, which part 19c is firmly connected via a bolt 30 with the deflecting lever 19; the part 19c is located in front of the sectional plane of the drawing and is therefore indicated by dot-dash lines.

A force transmission lever 31 is also supported on the pivot shaft 18 of the guide lever 16, and a torque control spring capsule 32 acting as a stroke stop for the sleeve bolt 14 is adjustably secured in this force transmission lever 31. At engine speeds below the maximum or full-load speed, one free end 31a of the force transmission lever 31, in response to the force exerted by a main governor spring 34, rests against a stop 33 fixed to the housing. The prestressing force of the main governor spring 34 acting as the maximum speed governor spring is determined by the location in which it is installed in the apparatus, and it can be adjusted by means of a spring support 35 embodied by a threaded sheath screwed into the governor housing 17. An idling stop screw 36 is disposed inside the governor housing 17 and fixes the idling position, shown, of the adjusting member 22 and thus fixes the position of the operating lever 24 as well. The starting and full-load position of the operating lever 24 is indicated by dot-dash lines and is determined by a full-load stop 37 shown by dashed lines.

A leaf spring 38 acting as the idling spring is disposed in the governor housing 17 approximately parallel to the force transmission lever 31; one end 38a of the leaf spring 38 rests on spring support 39b, which is adjustable in order to adjust the prestressing force of the leaf spring 38, and the other end 38b presses against a transverse bolt 41 in the guide lever 16 and thereby transmits the force of the leaf spring 38 onto the governor sleeve 13.

The spring support for the first end 38a of the leaf spring 38 is embodied by a convexly shaped bearing surface 39b on a head 39a of an idling adjusting screw 39. The idling adjusting screw 39 also serves at the same time as a guide for an end section 42a of a support bearing 42 resting on the leaf spring 38 between the two ends 38a and 38b. The support bearing 42 is provided on its side oriented toward the leaf spring 38 with a curved rolloff path 43, by means of which the effective spring length of the leaf spring 38 at a given time is fixed. In the illustrated position of rest of all the governor parts, the leaf spring 38 is prestressed by the idling adjusting screw 39 to such an extent that the spring length which is effective in this position is determined at a bearing point on the curved rolloff path 43 indicated with an arrow P1. If with increasing engine speed the governor sleeve 13 is moved by the flyweights 12 toward the torque control spring capsule 32 within an idling sleeve path a, then the effective spring length of the leaf spring 38 is shortened in accordance with the embodiment of the curved rolloff path 43 in the direction of a second bearing point P2 indicated by way of example. The angle of inclination $\alpha$ shown by way of example for this point P2 thereby decreases. The curved rolloff path 43 shown has a continuously curved course; however, it is also possible for it to have at least two points where it changes course, for instance at the bearing points P1 and P2, should governor curves of such a shape be required.

An adjusting cam 44 is rotatably supported on a bearing arm 31b of the force transmission lever 31 gripping around the leaf spring 38; in FIG. 1, this is embodied by an adjusting eccentric 44 supported inside support bearing 42. A pivot shaft 44a of the adjusting cam 44 is connected in a rotationally fixed manner with an adjusting lever 45 and coupled via a connecting link guide 46 with the adjusting member 22.

The connecting link guide 46 in the illustrated embodiment comprises an oblong slot in the adjusting lever 45 and a pin 47 engaging this oblong slot and secured on the adjusting member 22. If the operating lever 24 and thus the adjusting member 22 which is connected therewith in a rotationally fixed manner are now pivoted out of the illustrated idling position about a pivot angle marked $\beta$ in the direction toward its full-load position indicated by dot-dash lines, then the curved rolloff path 43 of the support bearing 42 is displaced toward the leaf spring 38 adjusted in accordance with this pivot angle $\beta$ by means of the adjusting cam 44 such as to increase the prestressing force of the leaf spring 38. At the same time, by means of the pin 21 of the adjusting member 22 engaging the connecting link guide 20 of the deflecting lever 19, the deflecting lever 19 and thus the bearing location 25 for the governor lever 26 are pivoted counterclockwise, so that depending upon the size of the pivot angle $\beta$ and the instantaneous load on the engine, a partial-load rpm is established which is dependent on the shape of the conecting link guide 46 on the adjusting lever 45 and is increased in comparison with the idling rpm; an increase in the supply quantity which is dependent on the form of the connecting link guide 20 in the deflecting lever 19 is established as well.

FIG. 2 shows the portion essential to the invention of a second practically embodied example, in which aside from the force transmission lever embodied as a sheet-metal part, the parts serving to vary the spring prestressing force of the idling spring 38 are embodied differently from the parts used in the first exemplary embodiment. The reference numerals of these elements in the second exemplary embodiment are assigned the same reference numerals but with a prime, while identical elements are identified by the same reference numerals without any change. The support bearing 42′ is embodied as a sheet-metal part, like the force transmission lever 31, and its curved rolloff path 43 oriented toward the leaf spring 38 is produced by a corresponding curvature of the support bearing 42′. One end 42a′ of the support bearing 42′ and the end 38a of the leaf spring 38 resting thereon are secured on a guide bushing 51, which in turn is placed upon the idling adjusting screw 39 and rests with a concave annular face 41a on the convex bearing face 39b on the head 39a of the idling adjusting screw 39. The adjusting cam 44′ is again embodied here as an adjusting eccentric, and it is secured on the pivot shaft 44a connected firmly with the adjusting lever 45. With this structure, in which the adjusting cam 44′ is embodied as an adjustable stop for the support bearing 42′, the adjusting cam 44′ may be provided with any desired cam shape capable of realizing a required adjusting principle, so that simultaneously with the shaping of the connecting link guide 46, which is shown here as of straight-line shape, and by means of the shaping of the support bearing 42′ itself, the increase in the prestressing force of the leaf spring 38 which takes place from degree to degree as the adjusting member 22 pivots can be controlled such that it is progressive, for instance, as shown in FIG. 3, or it may adhere to some other principle.

In the diagram shown in FIG. 3, a governor performance graph is shown in which several characteristic governing curves of the governor according to the invention are plotted. The governing path R of the governor rod 28 is plotted on the ordinate, while the rpm n is plotted on the abscissa. A full-load governing curve a, which includes points A, B, C, D and E, applies in the illustrated form only after starting with the operating lever 24 resting on the full-load stop 37; during operation, however, the curve shown in solid lines and defined by points F-C-D-E applies, because of a starting lock or starting block means which is known and is therefore not shown further or described herein. Between points C and C1, a torque control is effected by the torque control spring capsule 32; a dropping curve of similar shape can also be controlled by means of the progressively acting idling leaf spring 38, as is indicated in a partial-load governing curve b by the dashed portion 4′ of the curve. The idling governing curve is marked c and connects the points G-H-J-K-L. The curve segment H-J shows the course of the governing path, which drops exponentially and is controlled by the leaf spring 38 during the course of rolling off on the rolloff curve 43, over the rpm n. The associated pivot angle $\beta$ is also shown, increasing by 5° intervals, rising from 0° in curve c to 20° at curve b and to 35° at curve a. By means of the main governor spring 34 which is adjusted in a fixed manner, the speed regulation is always effected at the same full-load speed $n_E$, for instance at points D and K in curves a and c.

It is not difficult to see in FIG. 3 that the curve segment H-J of the idling governing curve c controlled by the leaf spring 38, wih the adjusting member 22 located forward, is shifed obliquely toward the upper right as far as the urve segment B-C of curve a. As a result, a sharp, rogressively rising increase in the supply quantit in the partial-load governing range at the left o the line connecting points J and C can be inferre from the plotted curves. The curve segments located above the horizontal line F-C fixed by the starting lock means are shown in dashed lines, because they apply only during starting; under load, however, such curves can produce excessive smoke. A dot-dash curve segment a′ of the curve a would be attainable because of the kinematics of the levers, but it is limited by the maximum possible governing path Rmax of the regulating rod 28, this path being defined by the line A-B. The excess path from B to M is absorbed by the force-storage spring included in the yielding tongue 27. The progressively increasing intervals between the individual governing curves beginning at the idling governing curve c and proceeding up to the full-load governing curve a are generated by means of the increase in the prestressing force of the leaf spring 38 (shift of the governing curves toward the right) which is controlled by the adjusting cam 44 and by means of the increase in governing path per degree of pivot angle of the adjusting member 22 (shift of the governing curves upward) controlled by the connecting link guide 20, so that in every load position of the adjusting member 22, a stable governing posture is attained in the event of a sharply rising increase in governing path while the engine speed is dropping.

The mode of operation of the minimum-maximum speed governor embodied in accordance with the invention will now be described briefly once again, referring to FIGS. 1 and 3:

In the illustrated position of rest of all the governor elements, the adjusting member 22 rests on the idling stop screw 36, and as a result of the prestressing force of the leaf spring 38, the governor sleeve 13 is pressed via the transverse bolt 41 and the guide lever 16 into the outset position shown, in which the governor lever 26 has displaced the governor rod 28 into its idling starting position G; in this case, this represents approximately 13.5 mm of governing path. In cold starting, the adjusting member 22 can be pivoted in the direction of its full-load stop 37, and the governor rod 28 will then be displaced as far as its starting position, marked S in FIG. 1. This position corresponds to point A of curve a at RWmax. RW sets forth the regulating or governing path.

If the engine speed increases, then the governor rod 28 remains in its instantaneous starting position if the adjusting member 22 is in the idling position, corresponding to the curve segment G-H in FIG. 3, until the prestressing force of the leaf spring 38 is overcome. As the engine speed increases further to an idling speed $n_{LL}$, the governing path R is then pulled back to a governing path for idling regulation indicated by the idling point LL on the curve a. During overrunning, the governor can run up as far as the maximum or full-load speed $n_E$, for instance, whereupon speed regulation then begins, at point K.

If the adjusting member is pivoted by 20°, for instance, during partial-load operation, then at a corresponding load a partial-load engine speed $n_{TL}$ is established as indicated by point TL on curve b. The range which in minimum-maximum speed governors is otherwise unregulated, that is, the range between the range determined by the idling springs and the maximum speed $n_E$, and in which only the supply quantity is adjusted in accordance with the pivot angle of the adjusting member, is in the speed governor according to the invention no longer compulsorily present in the speed governor according to the invention; in the exemplary embodiment of FIG. 1 described in connection with FIG. 3, it is present only in the upper engine speed range. Thus, it is possible to adapt the supply quantity and the partial load rpm $n_{TL}$ being established to engine requirements in every pivoted position of the adjusting member 22. Optimizing of the governor performance graph in a manner designed for a specific engine can be accomplished beforehand by means of the design of the shapes of the adjusting cam 44, the curved rolloff path 43 and the connecting link guides 20 and 46. As curve segment b' shows, the leaf spring 38 can also fulfill the function of a torque control spring. In the present example, however, a known torque control spring capsule 32 is used.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A minimum-maximum speed governor for fuel-injected internal combustion engines, in particular for Diesel vehicle engines, comprising:
    a governor lever coupled with a supply quantity adjusting member of an injection pump, said governor lever being actuatable at least indirectly by means of a governor sleeve moved in accordance with engine speed and by means of an adjusting member pivotable in order to vary a fuel supply quantity arbitrarily,
    a leaf spring acting as an idling spring, one end of said spring rests on a spring support which is adjustable in order to adjust a prestressing force of the leaf spring and another end of said spring support transmits the force of the leaf spring onto the governor sleeve,
    a support bearing placed against the leaf spring, the support bearing being provided with a curved rolloff path determining the effective spring length of the leaf spring, and
    an adjusting cam actuatable by the adjusting member, by means of which cam the operative position of the support bearing is variable in accordance with the pivot angle ($\beta$) of the adjusting member,
    said curved rolloff path of the support bearing being adjustable toward the leaf spring by means of the adjusting cam in accordance with the pivot angle ($\beta$) of the adjusting member which is pivotable out of the idling position into a load position, the adjustment of the support bearing being such as to increase a prestressing force of the leaf spring, and that the adjusting cam is supported on a force transmission lever.

2. A minimum-maximum speed governor as defined by claim 1, wherein the adjusting cam is rotatable in accordance with the pivot angle ($\beta$) of the adjusting member, wherein the adjusting cam is connected in a rotationally fixed manner with an adjusting lever, which is coupled via a connecting link guide with the adjusting member.

3. A minimum-maximum speed governor as defined by claim 2, wherein by means of an appropriate shaping of the adjusting cam and of the connecting link guide for the adjusting lever, the intensity of the adjustment of the support bearing effected in accordance with the pivot angle ($\beta$) of the adjusting member is adaptable to the required operating conditions.

4. A minimum-maximum speed governor as defined by claim 2, wherein both the adjusting member and the governor sleeve are coupled with the governor lever via a deflecting lever provided with a connecting link guide for the adjusting member, wherein by means of an appropriate shaping of the adjusting cam and of the connecting link guides for the adjusting lever and the deflecting lever, the intensity of the adjustment of the support bearing and of the governor lever effected in accordance with a given pivot angle ($\beta$) of the adjusting member is adaptable to the required operating conditions.

5. A minimum-maximum speed governor as defined by claim 1, wherein the spring support for one end of the leaf spring is embodied on a head of an idling adjusting screw, which simultaneously also acts as a guide for one end section of the support bearing, characterized in that the spring support is embodied by a convex bearing face on the head of the idling adjusting screw, and that the one end of the leaf spring and the one section of the support bearing are secured on a guide bushing, which in turn is placed onto the idling adjusting screw and rests with a concave annular face on the bearing face of the head.

6. A minimum-maximum speed governor as defined by claim 2, wherein the spring support for one end of the leaf spring is embodied on a head of an idling adjusting screw, which simultaneously also acts as a guide for one end section of the support bearing, characterized in that the spring support is embodied by a convex bearing face on the head of the idling adjusting screw, and that the one end of the leaf spring and the one section of the support bearing are secured on a guide bushing, which in turn is placed onto the idling adjusting screw and rests with a concave annular face on the bearing face of the head.

7. A minimum-maximum speed governor as defined by claim 3, wherein the support bearing is embodied in one piece and with a curved rolloff path having a continuously curved course, and that by means of the adjusting cam a continuous increase, which with a linear pivoting forward of the adjusting member preferably rises progressively, in both the prestressing force and the spring rate of the leaf spring is controllable.

8. A minimum-maximum speed governor as defined by claim 4, wherein the support bearing is embodied in one piece and with a curved rolloff path having a continuously curved course, and that by means of the adjusting cam a continuous increase, which with a linear pivoting forward of the adjusting member preferably rises progressively, in both the prestressing force and the spring rate of the leaf spring is controllable.

9. A minimum-maximum speed governor as defined by claim 5, wherein the support bearing is embodied in one piece and with a curved rolloff path having a continuously curved course, and that by means of the adjusting cam a continuous increase, which with a linear pivoting forward of the adjusting member preferably rises progressively, in both the prestressing force and the spring rate of the leaf spring is controllable.

10. A minimum-maximum speed governor as defined by claim 6, wherein the support bearing is embodied in one piece and with a curved rolloff path having a continuously curved course, and that by means of the adjusting cam a continuous increase, which with a linear pivoting forward of the adjusting member preferably rises progressively, in both the prestressing force and the spring rate of the leaf spring is controllable.

* * * * *